March 3, 1931. J. J. NAUGLE 1,794,862
PREFILTERING MEANS
Filed May 22, 1922
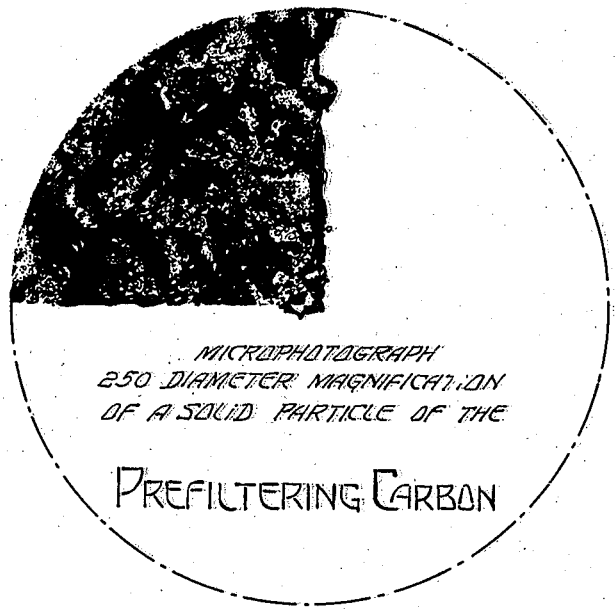

Patented Mar. 3, 1931

1,794,862

UNITED STATES PATENT OFFICE

JOHN J. NAUGLE, OF BROOKLYN, NEW YORK

PREFILTERING MEANS

Application filed May 22, 1922. Serial No. 562,828.

My present invention relates to means for, and methods, of prefiltering liquids, such as vegetable and mineral oils, sugar melts, syrups, molasses, and liquids of a like or different nature, which have impurities, such as suspended solid and collodial matters, which impurities it is desired to remove in an efficient and expeditious manner.

It is an object of the present invention to provide means and methods of the general character specified above which shall enable the preliminary filtration of liquids of the character specified above in a rapid and thoroughly efficient manner, so as to prepare the same for any desired subsequent purification step which may aim to decolorize and deodorize the liquids referred to. The prefiltering means of the present invention preferably have substantially no decolorizing and no deodorizing powers, since this might interfere with the proper functioning of the present invention as an ideal method and means for the rapid filtration of liquids of the character specified above, preliminary to the subsequent purification treatment for decolorizing and deodorizing the same.

The product of the present invention, in view of the fact that it is cheap and may be readily and economically manufactured, and in view of the further fact that it may be revivified after use a large number of times, sometimes as often as twenty times, and seldom less than ten times, may be used in place of diatomaceous earth and which, even in the best grades, contains from about 1.5% to 2% of water-soluble substances which impart an undesirable flavor, or other undesirable properties, to the liquid filtered through the same, a disadvantage which is practically entirely avoided by the use of the product of the present invention. This is, therefore, as far as I am aware, the first time that it has been made possible, in a commercial and thoroughly practical and economical manner, to substitute for the diatomaceous earth, with its various defects and shortcomings, a carbonaceous prefiltering medium having properties ideally suiting it for the desired purpose.

In the patent to Langville, No. 475,062, dated May 17, 1892, and entitled "Carbon product", there is disclosed a carbon product suitable for use as a pigment, or for making electric-light carbons, or in the manufacture of gunpowder, which carbon product is derived from suitable residues, such as the residues derived from the treatment of wood in the manufacture of wood pulp by the alkaline process. It has also been proposed more recently to treat the carbon product of Langville in such a manner as to obtain a finely divided, highly activated carbon for use as a decolorizing and deodorizing medium in the purification of liquids.

I have, however, discovered that the carbon product of Langville, if care be taken in the process of its manufacture to avoid any substantial activation of the same, and to prevent the same from becoming too dense, a feature which would render such product all the more satisfactory for the purposes which Langville had in mind, but far less satisfactory for the purposes of the present invention, is admirably suited as a prefiltering medium to remove suspended matter in liquids of the general character referred to above, preliminary to subjecting the same to a purification treatment in order to decolorize and deodorize the same.

Such a medium, if prepared with the precautions mentioned above, is not only very cheap and economical, and not only offers little difficulties to its proper manufacture from suitable carbonized lignin residues, such as the carbonized lignin residues derived from the manufacture of wood pulp by the alkaline process, but also permits a very rapid rate of filtration, and yields liquid products which are in nearly perfect condition for subsequent purification by treatment with an activated carbon for decolorizing and deodorizing the same.

For purposes of illustration, I shall, in the accompanying specification describe an illustrative embodiment of the method and means of the present invention. It is, however, to be clearly understood that my invention is not limited to the specific embodiment thereof herein shown and described for pruposes of example merely.

Starting with the raw material of the Langville patent mentioned above, and noting that the term "lignin" as used in the present specification and claims, includes also resinous bodies present in wood, the lignin derived as a residue or waste from the manufacture of wood pulp by the alkaline process is carefully carbonized so as to leave the same of a very porous structure which retains in its porosities a considerable amount of alkaline and other mineral substances.

For the most efficient type of prefiltering medium in accordance with the present invention, the insoluble mineral residues in the carbonized lignin may be partly retained, but the alkaline residues should be substantially entirely eliminated. In the finished product of the present invention, the insoluble mineral residues referred to, and probably comprising iron oxide, silicious matter, basic sulphates and like substances, may constitute as much as 5%, and almost always more than 2%, by weight, on a dry basis, of the finished product.

This desirable result may readily be accomplished by treating the carbonized lignin with a reagent calculated to eliminate the alkaline residues but without substantially effecting the elimination of the other mineral residues. For example, the carbonized lignin may be treated with a weak solution of hydrochloric acid, such as a one-half per cent. solution of this or any equivalent mineral acid.

The properties of the product of the present invention for the desired purpose of providing an ideal prefiltering medium, may be further enhanced and the perviousness of the finished product substantially increased by eliminating the less pervious, or heavier and more completely mineralized, bodies. This may be done, for example, by a system of flotation or decantation which permits the heavier and less desirable bodies to settle away from the lighter and more pervious bodies which may then be floated off and recovered for use in the final product. This method of increasing the filtering power and perviousness of the final product is far superior to the more costly and less efficient treatment with heat and acids which has hitherto been proposed and which tends to activate the carbon and thus render the same less suitable for the purposes of the present invention.

In order to more thoroughly eliminate undesirable water-soluble impurities from the carbonized lignin residues, I prefer to employ the following novel and highly efficient means: I prefer, as by means of a high pressure pump, to pack such residues, from which most of the alkaline substances have already been eliminated in the manner already set forth above, into a filtering press and then pass water alternately in opposite directions through the packed mass or cake of the residues. This action thoroughly impregnates and washes the packed residues.

This cleaning action with the water, or its equivalent, is continued until the water-soluble impurities of the residues have been substantially entirely dissolved out and eliminated. Prior to this treatment the residues may have been given a preliminary washing treatment with water, as in a filter press operated in the manner just described, and also an intermediate washing treatment with an alkali neutralizing or eliminating agent, such as a weak solution of a mineral acid, which is preferably also administered in a filter press operated in the manner set forth above.

The resulting carbonized lignin, which is comparatively coarse grained, substantially free from alkaline substances and may in fact be slightly acid, is now carefully dried, care being taken to avoid at all stages of the process any operation which would tend to activate the carbonized lignin, thus converting the same from a prefiltering medium into an activated decolorizing and deodorizing carbon.

The resulting product constitutes an ideal unactivated prefiltering medium having little decolorizing and deodorizing values but possessing a very porous structure permitting a high rate of filtration. It may, for example, be used with great success for clarifying and filtering such important and commercially valuable products as wines, vinegars, fruit syrups, and the like, where it is not desired that the natural colors, flavors and "bouquets" of such liquids should be affected by the filtering process. For such uses an activated carbon would not be available and could not be used, since such a carbon would have the undesirable effect of rendering the product commercially valueless and useless due to the removal from the same of the desired coloring, flavoring and "bouquet" substances.

The carbonized lignin made in accordance with the process described above is substantially free from alkaline residues and from water-soluble substances and may in fact be even slightly acid, but contains other mineral residues which tend to deprive the same of any substantial decolorizing and deodorizing properties, but leave the same in a condition in which it may effect the desired prefiltration step in a highly efficient and very expeditious manner.

The structure of the unactivated prefiltering carbon of the present invention is illustrated more or less diagrammatically in the single figure of the drawing which comprises a reproduction of a microphotograph of one form of unactivated prefiltering carbon made in accordance with the present invention. This drawing shows the great porosity of the carbonized lignin made in accordance with the present invention and explains its remarkable filtration qualities.

While the unactivated prefiltering carbon or carbonized lignin residues of the present invention may be used in any desired manner as a prefiltering medium for rapid filtration, I prefer to use the same as a prefiltering medium for carrying out the prefiltering step in connection with a liquid of the general character specified above, having solid and colloidal matter suspended therein, in conjunction with a subsequent purification step for decolorizing and deodorizing such a liquid by the use of any of the activated decolorizing and deodorizing charcoals now on the market. The combination of these two prefiltering and purifying steps respectively, in the order designated and by the use of the means recommended in the herein described embodiment of the method of the present invention, constitutes an ideal method for the preliminary filtration and the subsequent purification of liquids of the classes enumerated above, due to the remarkable affinity of the product of the present invention for colloidal matters, the preliminary removal of which greatly facilitates and enhances the purifying action of the activated carbon, which may subsequently be used for deodorizing and decolorizing the liquids being treated. This affinity often amounts to as much as is equivalent to a removal of 80 or even 90% of the colloidal substances present in the liquid being prefiltered by the use of the product of the present invention.

What I claim is:

1. A substantially unactivated prefiltering medium having relatively low decolorizing and deodorizing value, but possessing a highly porous structure permitting a high rate of filtration and comprising carbonized lignin residues substantially free from all alkaline residues.

2. A substantially unactivated prefiltering medium having relatively low decolorizing and deodorizing value, but possessing a highly porous structure permitting a high rate of filtration and comprising carbonized lignin residues rendered substantially free from all alkaline residues by a preliminary treatment with an alkali-eliminating reagent.

3. A substantially unactivated prefiltering medium having relatively low decolorizing and deodorizing value, but possessing a highly porous structure permitting a high rate of filtration and comprising carbonized lignin residues containing mineral residues but being substantially free from all alkaline substances.

In testimony whereof, I have signed my name to this specification this 16th day of May, 1922.

JOHN J. NAUGLE.